Jan. 13, 1970  H. B. WHITMORE  3,489,172
LINEAR PRESSURE BLEED REGULATOR
Filed May 22, 1967
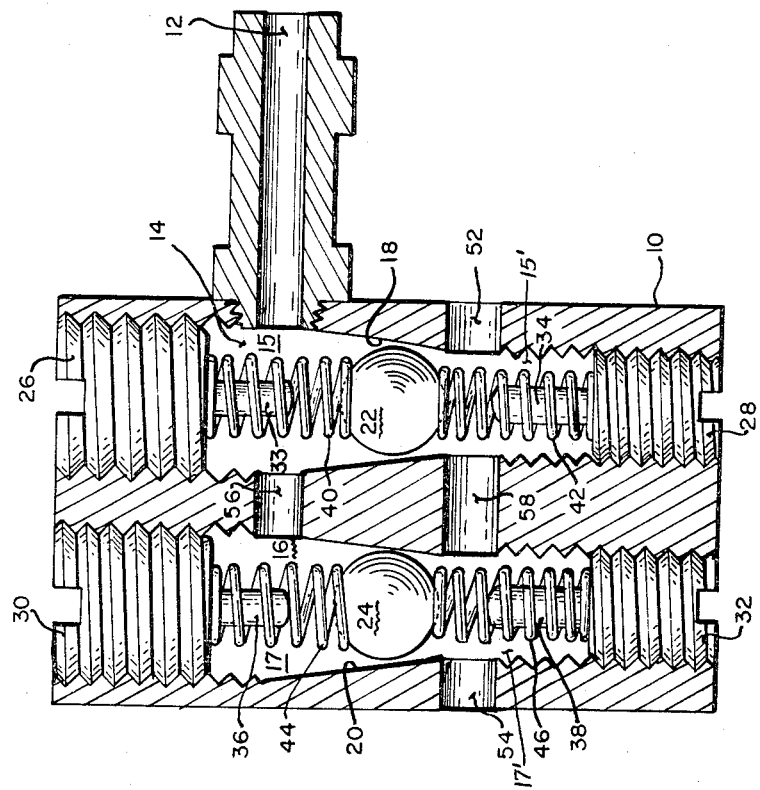
INVENTOR.
HENRY B. WHITMORE
ATTORNEYS

United States Patent Office 3,489,172
Patented Jan. 13, 1970

3,489,172
LINEAR PRESSURE BLEED REGULATOR
Henry B. Whitmore, Rte. 5, Box 369,
San Antonio, Tex. 78211
Filed May 22, 1967, Ser. No. 641,440
Int. Cl. F16k *17/26, 21/04;* F15d *1/00*
U.S. Cl. 137—512.1                    1 Claim

ABSTRACT OF THE DISCLOSURE

A pair of communicating and parallel longitudinal bores forming bleed and dump chambers in a single valve casing, each bore has a tapered valve seat and a floating pressure sensitive valve head in the form of a ball balanced between a pair of springs whose tension can be regulated. The springs in the bleed chamber are relatively stiff and those in the dump section relatively weak. The pressure differential determines the movement of the pressure sensitive valve heads toward or away from the valve seats. The rate of flow is held linear and constant through pressure variations, and dump occurs when a predetermined differential pressure point is reached.

---

The invention relates to a linear pressure bleed regulator and, more particularly, to an automatic pressure responsive composite assembly permitting controlled low rate fluid flow followed by a quick acting "dump" flow when a predetermined pressure differential occurs.

One of the objects of the invention is the provision of a device for the automatic monitoring of blood pressure of human subjects in situations when blood pressure instruments cannot be manually applied, such as pressure suits in altitude chambers, and in centirfuges and like environments. It is also applicable to distance control and telemetry biomedical monitoring systems and to automatic regulation of pressure in pressure suits, and other pressure areas.

A further object of the invention is a device which can be used as an automatic ascent rate control for an overcompression chamber, or regulate even flow of fluids from a high pressure source to a low pressure area at a predetermined rate.

A further object of the invention is the provision of a linear bleed down device whose bleed down rate is constant with varying pressures and one in which dumping, or complete pressure release occurs at a predetermined low pressure point.

A still further object of the invention is the provision of a composite ball valve balanced between opposing springs, sensing the pressure differential, compensating automatically by increasing or decreasing the valve opening to allow linear bleed at varying pressures, and to provide also a dump mechanism operating at a predetermined pressure point.

These and other advantages, features and objects of the invention will become more apparent from the following description taken in connection with the illustrative embodiments in the accompanying drawings, wherein:

FIGURE 1 is a longitudinal cross section of the device in its composite form; and FIGURE 2 is a longitudinal cross section of a modified and simplified form of the device.

Referring more in detail to the drawing and first to FIGURE 1, a valve casing 10 is provided with inlet 12 and a pair of bores extending the length of the casing and dividing the casing into longitudinally extending chambers 14 and 16. These bores are each tapered to form seats 18 and 20 for the ball valves 22 and 24, designated for convenience, dump valve and bleed valve respectively. These valves divide the dump and bleed chamber 14 and 16 into upper and lower areas. On the drawing the upper dump chamber is designated 15, the lower dump chamber as 15′; the upper bleed chamber is designated 17 and the lower is designated 17′. Both ends of each bore are screw threaded to accommodate the adjustment screws 26, 28, 30 and 32. Each screw is proided with a spring guide shown at 33, 34, 36 and 38, respectively, and acting as guides, respectively, for dump tension springs 40, 42, and bleed springs 44 and 46.

The ball valves or valve heads 22 and 24 are free floating and, acting as pressure sensitive bodies, are responsive to an established pressure differential between springs 40, 42 and 44, 46, respectively. Since variations in inlet flow pressure may occur, automatic compensation with the bleed rate is achieved in accordance with the spring pressures utilized.

Outlets 52 and 54 provide passageways to ambient below the ball valves or valve heads 22 and 24. The chambers 15 and 17 communicate with one another by means of passageway 56 at the upper portion of chambers 14 and 16. Passageway 58 provides communication between areas 15′ and 17′, the areas located below the valves of each of the chambers 14 and 16.

The tension on each spring is adjusted by means of its appropriate adjusting screw to provide the following operation of the unit. Chamber 14, representing the dump chamber, has its relatively weak springs 40 and 42 adjusted by means of dump adjusting screws 26 and 28, such that when gas or fluid enters the inlet port 12, the fluid is directed into chamber 14 and, because of the weakness of the springs, the ball valve 22 is biased toward the valve seat 18 to close off the passageway to the outlets 52 and 54. The dump operation would occur at a predetermined pressure drop at the inlet to allow the dump valve head 22 to open and thereby release pressure of the fluid from the outlet portion of chamber 14. Since the springs are weak the valve will operate to fully opened and fully closed at a preset pressure differential.

Adjusting screws 30 and 32 vary the tension exerted by springs 44 and 46, respectively, in order to provide adjustment of the bleed rate and linearity. Springs 44 and 46 are relatively stiff, and, therefore, pressure from the inlet 12 is transmitted to chamber 14 and through passageway 56 to the bleed chamber 16 such that the pressure differential between outlet portions of the chamber and the inlet portion causes movement of bleed ball valve or valve head 24 toward or away from the seat 20 at a slow, linear and constant rate. Thus, varying pressures at the inlet will produce varying degrees of closure of the bleed ball valve 24 to provide the necessary adjustment in bleed rate. When the pressure dieffrential is low, of course, the dump ball valve 22 will come into operation and open at a predetermined pressure to provide the dumping action. The rate of flow of the bleed is linear and proceds under decreasing pressures.

The device has particular utility with a blood pressure cuff connected to the outlets. The unit then allows for a linear bleed down until the diastolic blood pressure has been established and recorded. Immediately thereafter the spring 42 overcomes the action of spring 40 and the dump ball valve 22 opens to deflate the blood pressure cuff.

Assuming that a fluid under pressure is applied to inlet 12 and all springs are adjusted by means of their appropriate adjusting screws, ball valve 22 will close against seat 18 at a relatively low pressure application while ball valve 24 would control the bleed by it in response to the differential between the inlet and outlet pressures in accordance with the spring biasing action. Upon removal or reduction of the inlet pressure, bleed ball valve 24 will move in an upward direction due to the lower pressure now in the upper chamber and the biasing action of spring 46. Because of the spring adjustment, the bleed rate is kept linear and constant until the point where the pressure differential allows spring 42 to control the dump ball valve 22 to open it and relieve the remaining pressure differential between the chambers. When the device is utilized as a regultor, of course, the bleed ball valve 24 acts as a pressure sensing device and controls the flow thereby in order to maintain it constant and linear. The device, therefore, has utility in the replacement of presently utilized aneroids for programmed changes in gas flow for outer space applications in addition to laboratory uses such as the injection of gaseous samples into gas chromatography apparatus.

In FIGURE 2 is shown a single bore valve casing 60 and a floating, hollow valve head 62 which moves toward and away from a tapered valve seat 64 under the regulated stress of springs 66 and 68. An inlet 70 and outlets 72 are located on opposite sides of the valve seat 64.

The operation of the single bore valve is similar to that shown and described above in connection with FIGURE 1. A higher degree of control of the bleed rate is possible with the composite casing, but the bleed down rate and the pressure point at which the valve 62 springs fully open to release the pressure in the dump operation can still be accurately controlled, first by the choice of springs 66 and 68 and second by the adjustment of the tension on each spring by the adjusting screws 74 and 76.

The valve head 62 which is also a pressure sensor moves toward the seat 64 with increase in inlet pressure and away from the seat when inlet pressure is reduced, automatically decreasing or increasing the bleed rate accordingly. The differential of the springs 66 and 68 may be so adjusted that when a diastolic pressure is reached and recorded, or when a pressure is reached which fulfills other specific requirements of use, the spring 66 overcomes the spring 68 and the system is immediately dumped and deflated.

I claim:
1. An automatic linear pressure bleed regulator comprising a composite valve casing having a bleed chamber and a dump chamber arranged in parallel relationship, in said valve casing, a valve seat in each chamber dividing each of said chambers into an upper area and a lower area, a pressure sensitive bleed valve adapted to seat on the valve seat in said bleed chamber to close communication past said valve between the upper and lower bleed areas, a pressure sensitive valve in said dump chamber for seating on the valve seat in said dump chamber and closing communication past said valve between the upper and lower bleed areas, an inlet to the upper dump area, an outlet to ambient from said lower dump area, a communicating duct between said upper dump area and said upper bleed area, providing continuous communication therebetween, a duct between said lower dump area and said lower bleed area providing continuous communication therebetween and an outlet from said lower bleed area, spring means located in the upper dump area for biasing the valve in said dump area to closed position, spring means located in the lower dump area and operating in response to an established spring rate differential to normally maintain the valve in said dump area in open position; spring means located in the upper bleed area for biasing the valve in the bleed area to closed position and spring means located in the lower bleed area operating in response to an established spring rate differential to normally maintain the valve in said bleed area in open position, the spring rates of all spring means being regulated so that dump occurs at, and the fluid flow from high pressure area to low pressure area proceeds at a rate responsive to, a predetermined pressure point.

References Cited

UNITED STATES PATENTS

| | | | |
|---|---|---|---|
| 2,184,773 | 12/1939 | Browning | 137—493.8 |
| 2,404,924 | 7/1946 | Sacchini | 137—512 |
| 2,459,326 | 1/1949 | Kremiller | 137—493 X |
| 2,541,282 | 2/1951 | Powers | 137—517 X |
| 2,570,937 | 10/1951 | Gash | 137—493.8 |
| 2,809,659 | 10/1957 | Gillespie et al. | 137—512 |
| 2,955,843 | 10/1960 | Chuba | 137—493.8 X |
| 3,106,226 | 10/1963 | Machen | 137—517 X |

FOREIGN PATENTS 1,152,284   9/1957   France.

WILLIAM F. O'DEA, Primary Examiner

D. J. ZOBKIW, Assistant Examiner

U.S. Cl. X.R.

137—493.8, 517, 529, 539; 138—43, 46